Patented Jan. 12, 1943

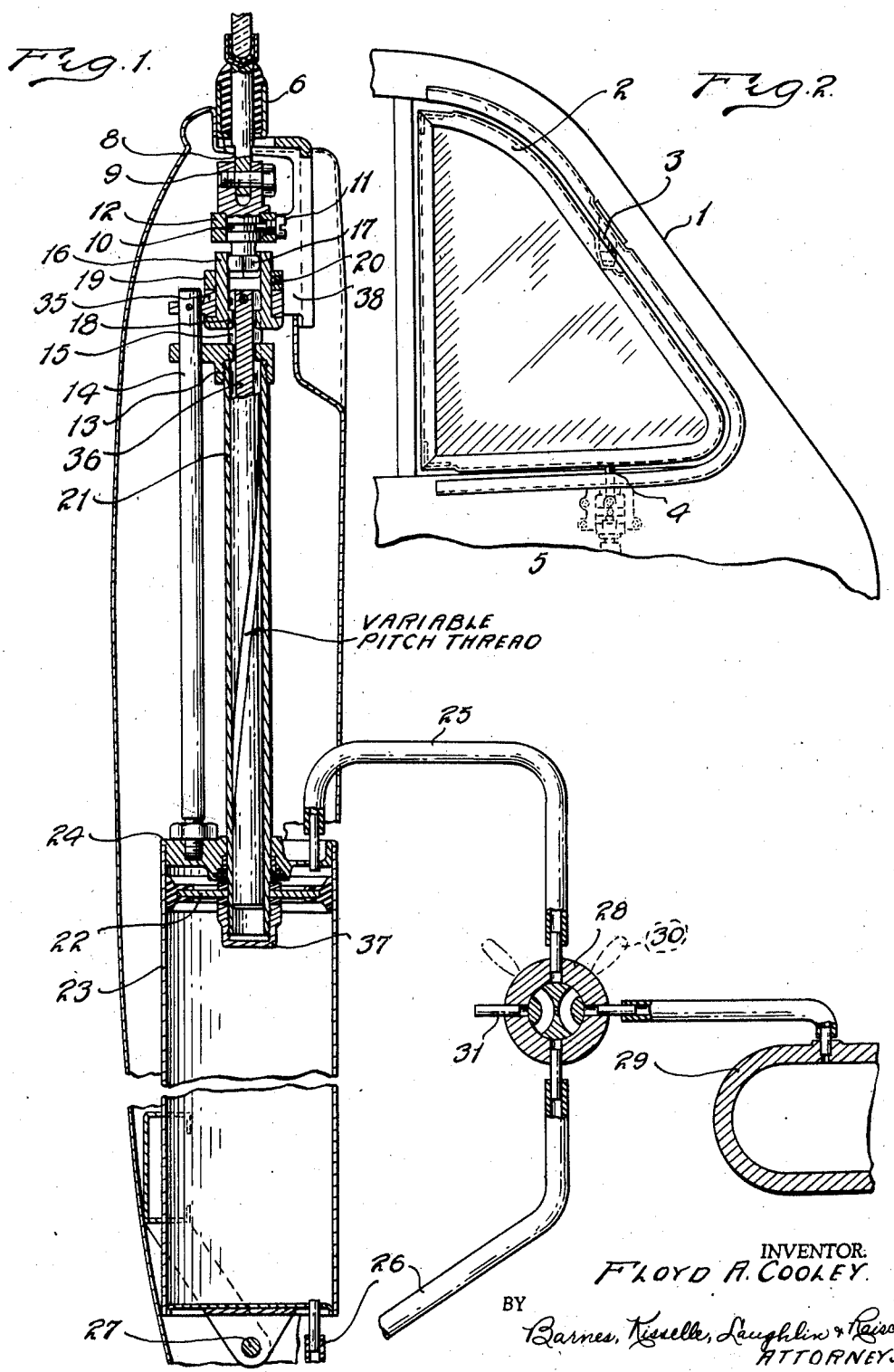

2,308,057

UNITED STATES PATENT OFFICE 2,308,057

FLUID OPERATOR FOR SWINGING PANELS

Floyd A. Cooley, Detroit, Mich., assignor to Ternstedt Manufacturing Company, Detroit, Mich., a corporation of Michigan Application January 21, 1941, Serial No. 375,154

4 Claims. (Cl. 268—117)

This invention relates to fluid operated window regulators, particularly vacuum operated.

It has for its object a window regulator designed to operate swinging panels particularly the swinging panel used in the "Fisher No Draft" ventilating system. This swinging panel is turned from a closed position 90° to 120° ordinarily. It is now usually operated by hand or by means of a hand operated window regulator, ordinarily of the worm and worm gear type. It is the object of the present invention to provide power operation for this swinging panel.

Referring to the drawing:

Fig. 1 is a vertical section of the operating mechanism.

Fig. 2 is a fragmentary view of the front of an automobile body showing the application of the mechanism to the swinging front panel of the "Fisher No Draft" ventilating system.

1 designates the windshield pillar, 2 the swinging ventilating panel pivoted on the vertical pivots 3 and 4 and 5 is the top portion of the operating mechanism.

Referring to Fig. 1: 6 is the window panel frame having a projecting spindle 8 which is bolted to a stud 9 which has an annular groove 10 in which the point of set screw 11 projects to hold the stud in bearing 12 fixed to the die cast bracket 38. 13 is a nut that is guided for vertical travel by the rod 14. This nut engages the high and variable pitch threads 15 of a screw shaft 36. The end of the threaded shaft is pinned to the bushing 16 which has a squared opening to receive the squared end 17 of the stud 9. This permits the assembly of the swinging panel to the operating mechanism by a simple slip joint. Note that the squared sides of the nut are slightly crowned. This affords a universal joint which permits some deviation in angularity of the screw shaft with respect to the spindle 8. This may be desirable because of the necessity of setting the cylinders at an angle because of the curvature of the door. The fixed bearings 12 and 35 will be set upon the bracket 38 to provide the proper angularity between spindle 8 and screw shaft 36.

Bushing 16 has its bearing in the bearing 35 which is a fixed part of the die cast bracket 38 and pinned to the upper end of the guide rod 14. An integral collar 18 on the lower end of the bushing holds the bushing from upward movement and a collar 19 secured to the bushing by a set screw 20 holds the bushing from downward movement with respect to its bearing 17a. A tube 21 fits closely around the screw shaft and forms a rotatable bearing for the screw shaft. This tube is screwed into the nut 13 at its upper end. The lower end of the tube is fixed to the piston 22 that is guided in the cylinder 23 of the vacuum motor. The lower end of the tube is capped by nut 37 to prevent fluid leakage around the screw shaft 36. Rod 14 is fastened to the end 24 of the cylinder.

A conduit 25 leads into the top of the cylinder and conduit 26 into the bottom of the cylinder. The bottom of the cylinder is pivotally supported at 27 so that it may easily be lined up with the squared end 17 to assemble the two parts together. A four-way valve is shown at 28 in the diagram but any suitable form of valve may be used for connecting the conduits 25 and 26 with the source of vacuum which is here shown as the engine manifold 29. The parts of the valve are here shown in neutral position. However, it will be seen that, by moving the valve handle 30 to the right or left, the engine vacuum is connected to either the conduits 25 or 26 and either of these conduits is also connected with the port 31 to the atmosphere.

When the vacuum causes the piston to rise or descend in the motor cylinder 23, this through the tube 21 causes the nut 13 to rise or descend. Inasmuch as the nut 13 is guided on the rod 14 and fixed to end of tube 21, it cannot rotate and, hence, it must cause the screw shaft 21 to rotate. But, it will be noted that the threads are of extreme pitch. The threads shown in the drawing only extend a little more than a quarter way around the shaft. In fact, it extends around the shaft the same number of degrees that the panel is to rotate. The ordinary throw of the panel is about 110° to 120°. So, the thread will extend around the panel the same distance. The screw shaft is a relatively long screw shaft and, consequently, the thread is long and the pitch is very great. Due to the length of the shaft and the fact that the thread traverses only about 120° on the shaft, the result is that the mechanical advantage for turning the shaft is relatively great. This is desirable and almost essential because the power of a vacuum motor is very limited. The piston has to have a considerable travel to do its work, or else the cylinder has to be made of relatively great diameter but this cannot be done within the limits of the wall space in an automobile door. Hence, long travel and a small amount of work for each unit of travel is necessary. This is achieved with the long and steep pitch screw shaft shown in the drawing.

I find it is desirable to use a variable pitch thread, as indicated by the printing in the drawing and also the drawing itself, although the degree of change in the pitch is not readily apparent to one casually inspecting the drawing. The upper portion of the screw has a lead approximately five times that of the lower portion. On the up stroke to close and seal the panel approximately 75% of the stroke, operating the nut on the lower portion of the screw, turns the panel approximately 115° from the completely open 120° position to within approximately 5% of completely closed position, the remaining 25% of the stroke operating the nut on the upper portion of the screw where the threads are almost parallel to their center line in the shaft This is necessary and desirable in order to get the force necessary from the rather limited power of the fluid operated piston to close the window tightly against the resistance of the rubber sealing strips.

What I claim is:

1. In a fluid operated window regulator for a swinging window, the combination of a long thread high pitch type of screw shaft having threads of relatively great pitch extending only partway around the screw shaft but with relatively great length, a nut having similar threads and guided for vertical sliding movement but held from rotation, a fixed rod guiding said nut and holding the nut from rotation, a fluid motor having a piston guided in vertical movement and a tube fastened to the piston and encasing and forming a bearing for said screw shaft and rigidly uniting the said nut and the piston.

2. In a fluid operated window regulator for a swinging window, a rotatable screw shaft having threads of relatively great pitch and length, a fluid motor having a reciprocating piston and a cylinder, a bearing for the upper end of the screw shaft, a rod fastened to the upper end of the cylinder and fastened to said bearing at its upper end, a nut slidably guided by said rod and a rigid tubular connection between said nut and said piston and encasing said screw shaft, the said nut engaging the threads of the screw shaft and causing the screw shaft to rotate when the nut is raised and lowered by the movement of the piston.

3. In a fluid operated window regulator for a swinging window, a rotatable screw shaft having threads of relatively great pitch and length, a fluid motor having a reciprocating piston and a cylinder, a bearing for the upper end of the screw shaft, a rod fastened to the upper end of the cylinder and fastened to said bearing at its upper end, a nut slidably guided by said rod and a tube telescoping and forming a bearing for the shaft and rigidly connecting said nut and said piston, the said nut engaging the threads of the screw shaft and causing the screw shaft to rotate when the nut is raised and lowered by the movement of the piston.

4. In a fluid operated window regulator for a swinging window closing against rubber window strips, the combination of a long thread high pitch type of screw shaft for connection with the window panel in registry with the end of the axis about which it swings and a fluid operated motor and nut for causing the said shaft to rotate and turn the window as the motor is operated to raise and lower the nut, the pitch of the screw threads being a variable one with an extremely high pitch for a section of the screw at the top so as to afford mechanical advantage necessary to close the window and seal the same against the weatherstrips.

FLOYD A. COOLEY.